No. 814,835. PATENTED MAR. 13, 1906.
J. CURTAIN.
CHECKING SYSTEM FOR HARNESS.
APPLICATION FILED SEPT. 6, 1905.
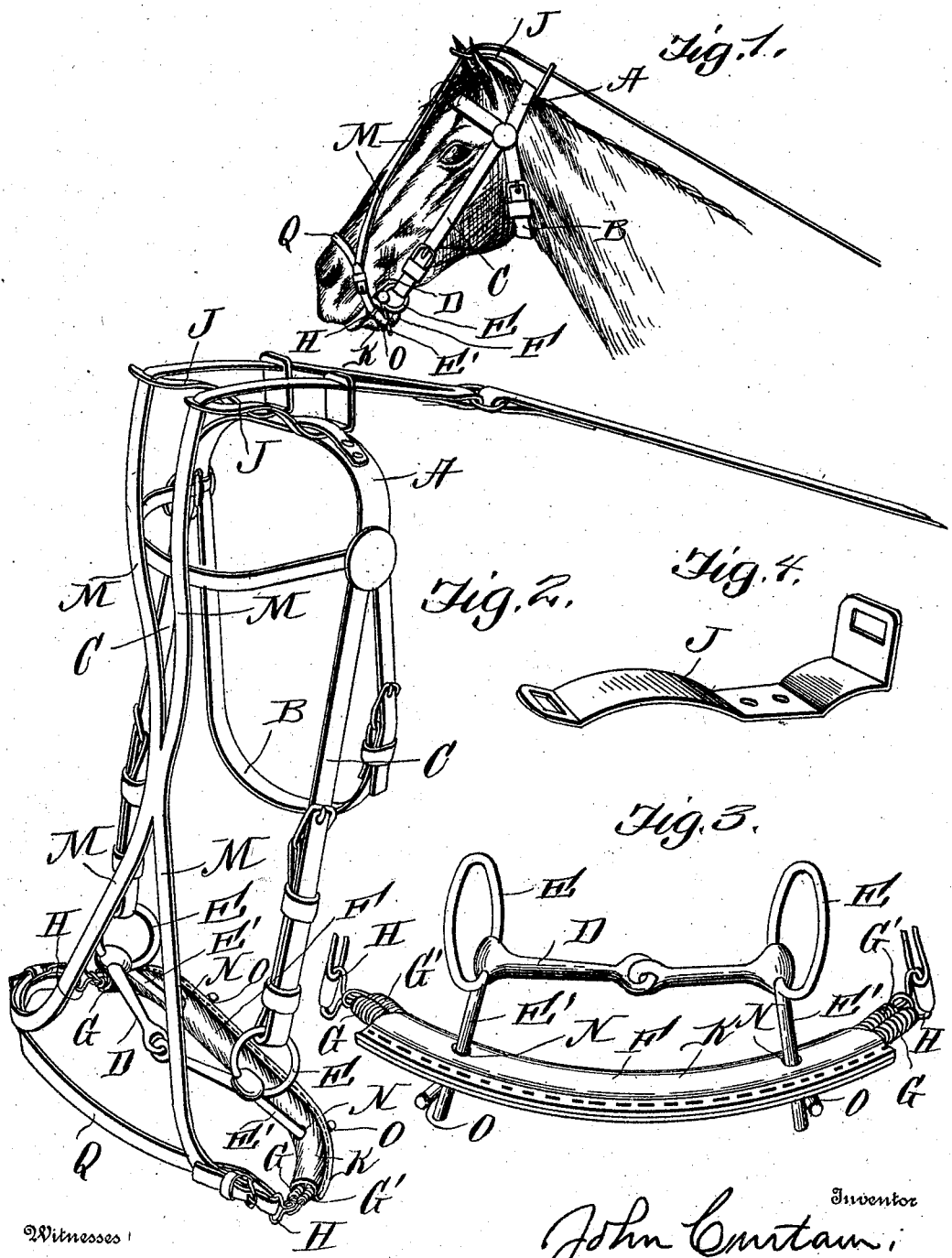

UNITED STATES PATENT OFFICE.

JOHN CURTAIN, OF ELKFALLS, KANSAS, ASSIGNOR OF ONE-HALF TO CLARENCE CURTAIN OF CIRCLEVILLE, OHIO.

CHECKING SYSTEM FOR HARNESS.

No. 814,835.   Specification of Letters Patent.   Patented March 13, 1906.

Application filed September 6, 1905. Serial No. 277,192.

*To all whom it may concern:*

Be it known that I, JOHN CURTAIN, a citizen of the United States, residing at Elkfalls, in the county of Elk and State of Kansas, have invented certain new and useful Improvements in Checking Systems for Harness; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in harness attachments, and especially in the provision of a new and improved means for checking an animal, whereby the apparatus will be elastic throughout, as the checking is from the chin with overdraw-straps, which are held from pressure against the face of the animal and so arranged as to allow the animal to have freedom of movement of its head without inconvenience incident to the checking mechanism.

Heretofore it has been common to utilize checking apparatus in which horses are checked from the mouth to the tail, with connections which are rigid throughout and where overdraw-checks are used, and pressure comes upon the top and face of the animal and the straps have a tendency to interfere with the mane and are apt to chafe the face and the head of the animal, so as to cause irritation, soreness, and always causing discomfort, which is manifested by uneasiness in the head of the animal tossing and fretting. To obviate these difficulties, I propose in my improved checking system to provide an elastic or spring chin-check, which is held in place by means of projecting arms from the bit and connected to the overdraw-straps, which are held from contact with the face or head of the animal by means of rigid loop-arms fastened to the crown-strap of a bridle.

My invention comprises various details of construction and combinations and arrangements of parts, which will be hereinafter fully described and then specifically defined in the appended claims.

My invention is illustrated in the accompanying drawings, in which—

Figure 1 is a perspective view showing the application of my strap to the head of a horse. Fig. 2 is an enlarged detail view of the bridle with checking apparatus attached thereto, and Fig. 3 is a detail view of the spring chin-checking feature. Fig. 4 is a detail modification of one of the loop-plates.

Reference now being had to the details of the drawings by letter, A designates the crown-strap of a bridle of the ordinary construction having a throat-strap B and bit-connecting straps C. The bit (designated by letter D in the drawings) is shown as made up of two sections which are connected together, although any form of bit may be utilized, and rings E are connected to the ends of the bit-sections. Each bit-section has the usual guard-finger E' projecting therefrom, which is utilized in my invention for the purpose of holding the spring chin-checking member F in place. Said member comprises two coiled springs G and G', which are connected together at their ends to an eye H, and a suitable covering K, of leather or other material, confines the two springs and allows the same to yield without interference therewith. Said covering for the springs is provided with two slots N to receive the fingers which project from the bit-rings, and cross-pieces O are soldered or otherwise fastened to said fingers after the latter have been inserted through the slots in the casing for the purpose of holding the casing upon said fingers. To the eyes at the ends of said springs are connected the ends of the overdraw check-straps M, which straps have a connecting-piece Q going over the nose of the animal, and said overdraw check-straps passing up over the face of the animal are held from contact with said face by their being passed through the apertures in the ends of the loop-plates J, which are riveted or otherwise suitably fastened to the crown-strap of the bridle. It will be noted that said loop-plates each has its rear end turned at right angles to the portion which is riveted to the crown-strap with its rear face flush with the rear edge of said crown-strap, while the forward ends of said plates are in a perpendicular line with the face, which relieves the face and head of all pressure, the check-straps passing from the rear ends of said loop-plates direct to the check-hook upon the saddle of a harness.

From the foregoing it will be noted that by the provision of a checking system, as shown and described, a simple and efficient means is afforded whereby in combining the spring chin-check and double loop-plates in connection with the overdraw-strap and bit a horse equipped with the apparatus may have perfect freedom in movements of its head, the springs underneath the chin of the animal yielding under the movements of the head, and in such movements the overdraw check-straps are held from irritating contact with the face and head of the animal.

While I have shown a particular detailed form of apparatus illustrating my new checking system for horses, it will be understood that I may vary the details of the same, if desired, in various ways without in any way departing from the spirit of the invention.

Having thus fully described my invention, what I claim as new, and desire to secure by Letters Patent, is—

1. A checking apparatus for harnesses comprising, in combination with a bit and bridle, a yielding member, connections between the same and said bit for holding said member in place, an overdraw check-strap connected to said member, loop-plates fastened to the crown-strap of the bridle, the rear ends of said plates being bent at right angles and having apertures therein, the forward ends projecting from the forward edge of the crown-strap and having apertures to receive the check-strap, as set forth.

2. A checking apparatus for harnesses comprising, in combination with a bit and bridle, springs, eyes to which the eyes of said springs are connected, an overdraw check-strap having ends secured to said eyes, means for holding said check-straps from contact with the face and head of an animal, a covering for said springs, said covering for the springs having apertures to receive fingers which project from the rings of the bit, and cross-pieces fastened to said fingers to retain the latter in the apertures of said covering, as set forth.

In testimony whereof I hereunto affix my signature in the presence of two witnesses.

JOHN CURTAIN.

Witnesses:
 B. F. BRILL,
 R. D. RICHOLSON.